J. FITZ.
Middlings-Purifier.

No. 217,788. Patented July 22, '879.

WITNESSES:
W. W. Hollingsworth
Amos W. Hart

INVENTOR:
Jacob Fitz
BY
ATTORNEYS.

UNITED STATES PATENT OFFICE.

JACOB FITZ, OF HANOVER, PENNSYLVANIA.

IMPROVEMENT IN MIDDLINGS-PURIFIERS.

Specification forming part of Letters Patent No. 217,788, dated July 22, 1879; application filed May 22, 1879.

*To all whom it may concern:*

Be it known that I, JACOB FITZ, of Hanover, in the county of York and State of Pennsylvania, have invented a new and Improved Middlings-Purifier; and I do hereby declare that the following is a full, clear, and exact description of the same.

The invention is an improvement in the class of middlings-purifiers in which an air-blast passes through a sieve or screen for the purpose of carrying off the dust, fuzz, and light particles of bran.

The improvement relates to the construction and arrangement of parts, as hereinafter described.

Figure 1:
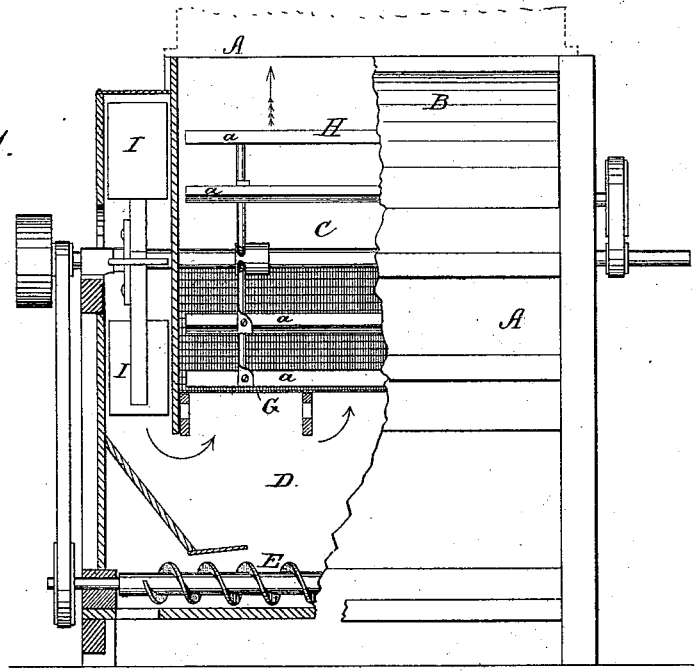
Figure 2:
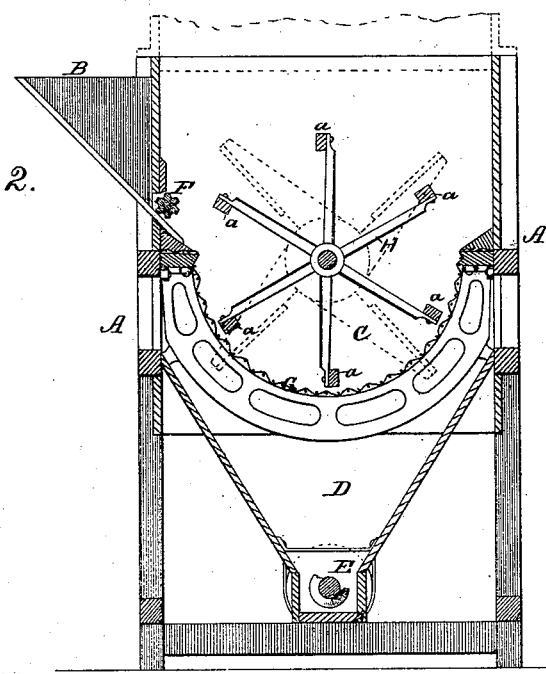

In the accompanying drawings, forming part of this specification, Figure 1 is partly a side elevation and partly a vertical central section of my improved machine. Fig. 2 is a vertical cross-section.

A indicates the casing or frame of the machine; B, the hopper; C, the receptacle for the middlings; D, the air-chamber beneath the hopper, and E a spiral conveyer for discharging the purified middlings.

The middlings are supplied to the receptacle C along its whole length, and in uniform quantity at every point, by means of the fluted shaft or roller F.

The stationary bottom G of the hopper is semi-cylindrical in form, and composed of wire-gauze whose meshes have the shape of an oblong rectangle. The reel H is placed concentric with the semicircular bottom G, and its peripheral bars *a* sweep close to the entire surface of the latter when the reel revolves.

A force-blast fan, I, is mounted on the axis of the reel at the end of the case A, and thus revolves with the same rapidity as the reel, so that the force of the blast in passing into the chamber D and up through the hopper-bottom G will always have a certain definite or invariable relation to the rapidity with which the reel revolves and carries the middlings over the surface of the screen G.

The blast serves both to cool the middlings and to separate therefrom the dust, fuzz, and bran, which are carried off in the trunk. (Shown in dotted lines.)

The passage of the air through the screen G is facilitated by the form of the meshes, since the width of the latter is the same as usual, while their length is considerably greater, thus affording less obstruction to the air and escape of the middlings downward, as well as less surface or fewer points for lodgment of middlings, which lodgment is incident to the operation of a machine of this class.

The meshes of the screen G are oblong, their longer diameter being concentric with the axis of the reel. This form and arrangement enable the meshes to be more quickly and perfectly cleaned by use of a brush, since its bristles enter the meshes more easily and to a greater length.

What I claim is—

In a middlings-purifier, the combination of the receptacle C and its stationary wire-gauze bottom or screen, having a semicircular form, the reel H, and the fan, located as shown and described, whereby a blast of air is forced into the chamber D and through the screen, while the reel revolves at the same speed as the fan, as specified.

JACOB FITZ.

Witnesses:
JOHN G. LAWCK,
WILSON BOLLINGER.